(12) United States Patent
Cunningham et al.

(10) Patent No.: US 8,156,732 B2
(45) Date of Patent: Apr. 17, 2012

(54) APPARATUS, SYSTEM, AND METHOD FOR REGENERATING AN EXHAUST GAS TREATMENT DEVICE

(75) Inventors: Michael Cunningham, Greenwood, IN (US); Bradlee Stroia, Columbus, IN (US)

(73) Assignee: Fleetguard, Inc., Nashville, TN (US)

( * ) Notice: Subject to any disclaimer, the term of this patent is extended or adjusted under 35 U.S.C. 154(b) by 1485 days.

(21) Appl. No.: 11/389,604

(22) Filed: Mar. 24, 2006

(65) Prior Publication Data

US 2007/0220865 A1 Sep. 27, 2007

(51) Int. Cl.
*F01N 3/00* (2006.01)
(52) U.S. Cl. ............... 60/286; 60/274; 60/285; 60/295; 60/301
(58) Field of Classification Search ............ 60/274, 60/276, 285, 286, 287, 288, 295, 297, 303
See application file for complete search history.

(56) References Cited

U.S. PATENT DOCUMENTS

| | | | |
|---|---|---|---|
| 5,201,802 A | 4/1993 | Hirota et al. | |
| 5,524,432 A | 6/1996 | Hansel | |
| 6,105,365 A | 8/2000 | Deeba et al. | |
| 6,125,629 A | 10/2000 | Patchett | |
| 6,167,698 B1 | 1/2001 | King et al. | |
| 6,176,078 B1 | 1/2001 | Balko et al. | |
| 6,182,444 B1 | 2/2001 | Fulton et al. | |
| 6,199,372 B1 | 3/2001 | Wakamoto | |
| 6,199,375 B1 | 3/2001 | Russell | |
| 6,305,161 B1* | 10/2001 | Takanohashi et al. | 60/301 |
| 6,327,848 B1* | 12/2001 | Poggio et al. | 60/276 |
| 6,345,496 B1* | 2/2002 | Fuwa et al. | 60/274 |
| 6,502,391 B1* | 1/2003 | Hirota et al. | 60/288 |
| 6,691,507 B1* | 2/2004 | Meyer et al. | 60/285 |
| 6,766,641 B1* | 7/2004 | Surnilla et al. | 60/285 |
| 6,769,243 B2* | 8/2004 | Lewis et al. | 60/277 |
| 6,823,843 B1* | 11/2004 | Goralski et al. | 123/435 |
| 6,843,054 B2* | 1/2005 | Taylor et al. | 60/275 |
| 6,932,069 B2* | 8/2005 | Suyama et al. | 123/674 |
| 6,976,356 B2* | 12/2005 | Okada et al. | 60/286 |
| 2004/0025499 A1* | 2/2004 | Nakatani et al. | 60/286 |
| 2004/0050037 A1 | 3/2004 | Betta et al. | |
| 2004/0187483 A1* | 9/2004 | Dalla Betta et al. | 60/286 |
| 2006/0021331 A1 | 2/2006 | Cizeron et al. | |
| 2006/0053774 A1 | 3/2006 | Kabasin | |
| 2006/0053776 A1 | 3/2006 | Ancimer et al. | |
| 2009/0049826 A1* | 2/2009 | Toshioka et al. | 60/286 |

OTHER PUBLICATIONS

PCT/US2007/064845, International Search Report and Written Opinion, Jan. 8, 2008.

* cited by examiner

*Primary Examiner* — Thomas Denion
*Assistant Examiner* — Jesse Bogue
(74) *Attorney, Agent, or Firm* — Kunzler Needham Massey & Thorpe (57) ABSTRACT

An apparatus, system, and method are disclosed for regenerating an exhaust gas treatment device. A controller module directs an injector to provide reductant to an exhaust gas treatment device over a plurality of rich intervals during a regeneration cycle. In addition, the controller module directs the injector to reduce the reductant provided to the exhaust gas treatment device over a lean interval between the rich intervals to create a lean environment within the exhaust gas treatment device. In one embodiment, the controller module modifies the reductant provided during each rich interval, the number of rich intervals, the length of the rich intervals, and the length of the lean intervals in response to an exhaust gas state.

20 Claims, 9 Drawing Sheets

APPARATUS, SYSTEM, AND METHOD FOR REGENERATING AN EXHAUST GAS TREATMENT DEVICE

BACKGROUND OF THE INVENTION

1. Field of the Invention

This invention relates to regenerating an exhaust gas treatment device and more particularly relates to regenerating the exhaust gas treatment device with reduced reductant and hydrocarbon slip.

2. Description of the Related Art

Engines that derive energy from combustion such as internal combustion engines produce an exhaust gas. The exhaust gas may include one or more undesirable emissions (hereinafter emissions) such as nitrogen oxide ("NOX"), carbon monoxide, and the like. Internal combustion engines such as diesel engines, gasoline engines, and the like often have exhaust systems with exhaust gas treatment devices such as catalytic converters to remove emissions from exhaust gas.

In one embodiment, a catalytic converter may be a NOX adsorber. The NOX adsorber adsorbes NOX from the exhaust gas onto a site of the NOX adsorber by oxidizing the NOX to create a nitrate. The nitrate remains on the NOX adsorber site, preventing the release of the NOX into the atmosphere.

NOX adsorbers may function more efficiently if regenerated. During regeneration the nitrate is driven from the NOX adsorber site and converted to nitrogen. Injecting a reductant into the exhaust gas typically regenerates NOX absorbers. The reductant creates a reductant to oxygen ratio with an excess of reductant in the exhaust gas. Excess reductant drives the nitrates from the NOX absorber site and converts the nitrates to nitrogen. Reductants typically include aqueous urea, hydrocarbon fuels such as diesel fuel, and the like.

Unfortunately, injecting the reductant into the exhaust gas to regenerate the exhaust gas treatment device consumes reductant, increasing the cost of operating the engine. In addition, some of the reductant used in regeneration is not consumed and passes into the atmosphere as hydrocarbon slip, potentially increasing one type of emission.

From the foregoing discussion, it should be apparent that a need exists for an apparatus, system, and method regenerate an exhaust gas treatment device using reductant more efficiently and with reduced hydrocarbon slip. Beneficially, such an apparatus, system, and method would reduce the expense and emissions from operating engines.

SUMMARY OF THE INVENTION

The present invention has been developed in response to the present state of the art, and in particular, in response to the problems and needs in the art that have not yet been fully solved by currently available exhaust gas treatment device regeneration methods. Accordingly, the present invention has been developed to provide an apparatus, system, and method for regenerating an exhaust gas treatment device that overcome many or all of the above-discussed shortcomings in the art.

The apparatus to regenerate an exhaust gas treatment device is provided with a logic unit containing a plurality of modules configured to functionally execute the necessary steps of providing reductant over a plurality of rich intervals and reducing the reductant over a lean interval between the rich intervals. These modules in the described embodiments include an injector and a controller module.

The injector provides reductant to the exhaust gas treatment device. In one embodiment, the injector disperses measured quantities of the reductant into exhaust gas prior to the exhaust gas entering the exhaust gas treatment device. The injector providing the reductant creates a rich environment within the exhaust gas treatment device wherein the reductant to oxygen ratio of the exhaust gas has an excess of reductant.

The injector provides reductant in response to commands from the controller module. The controller module directs the injector to provide reductant during a regeneration cycle. In addition, the controller module directs the injector to provide reductant over a plurality of rich intervals during the regeneration cycle. The controller module further directs the injector to reduce the reductant provided to the exhaust gas treatment device over a lean interval between each rich interval. During the lean interval, the reductant to oxygen ratio of the exhaust gas has an excess of oxygen.

In one embodiment, the excess oxygen of the lean interval consumes excess reductant in the exhaust gas. Thus the apparatus may reduce the reductant that exits the exhaust gas treatment device as hydrocarbon slip. In addition the apparatus may reduce the quantity of reductant required to regenerate the exhaust gas treatment device, reducing the cost of regeneration.

A system of the present invention is also presented to regenerate an exhaust gas treatment device. The system may be embodied in a diesel engine. In particular, the system, in one embodiment, includes an internal combustion engine, an exhaust gas treatment device, an injector, and a controller module.

The internal combustion engine oxidizes a hydrocarbon-based fuel such as diesel fuel to create mechanical energy. In addition, the internal combustion engine creates an exhaust gas that includes emissions. The emissions may include NOX. The exhaust gas treatment device reduces the emissions from the exhaust gas. In one embodiment, the exhaust gas treatment device adsorbs NOX as nitrates to reduce NOX emissions.

The injector provides reductant to the exhaust gas treatment device to regenerate the exhaust gas treatment device. In one embodiment, the reductant drives adsorbed nitrates from the exhaust gas treatment device. The controller module directs the injector to provide the reductant over a plurality of rich intervals during a regeneration cycle. In addition, the controller module directs the injector to reduce the reductant provided over a lean interval between the rich intervals. The system regenerates the exhaust gas treatment device with reduced reductant and further reduces hydrocarbon slip during regeneration.

A method of the present invention is also presented for regenerating an exhaust gas treatment device. The method in the disclosed embodiments substantially includes the steps necessary to carry out the functions presented above with respect to the operation of the described apparatus and system. In one embodiment, the method includes providing reductant over a plurality of rich intervals and reducing the reductant over a lean interval between the rich intervals. The method also may include measuring exhaust gas temperature, measuring exhaust gas pressure, measuring NOX in the exhaust gas, determining hydrocarbon slip, and modifying the rich and lean intervals.

In one embodiment, a temperature sensor module measures the temperature of exhaust gas and communicates the temperature measurement to a controller module. A pressure sensor module may also measure the pressure of the exhaust gas and communicate the pressure measurement to the controller module. In one embodiment, a NOX sensor module measures the NOX in the exhaust gas and communicates the NOX measurement to the controller module. In a certain embodiment, an L sensor module determines the hydrocarbon slip of the exhaust gas and communicates the hydrocarbon slip to the controller module. An exhaust gas state may comprise the temperature measurement, the pressure measurement, the NOX measurement, and/or the hydrocarbon slip determination.

The controller module directs an injector to provide reductant to an exhaust gas treatment device over a plurality of rich intervals during a regeneration cycle. In addition, the controller module directs the injector to reduce the reductant provided to the exhaust gas treatment device over a lean interval between the rich intervals to create a lean environment within the exhaust gas treatment device. In one embodiment, the controller module modifies the reductant provided during each rich interval, the number of rich intervals, the length of the rich intervals, and the length of the lean intervals in response to the exhaust gas state. The method efficiently regenerates the exhaust gas treatment device while reducing hydrocarbon slip.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention provides reductant to an exhaust gas treatment device over a plurality of rich intervals during a regeneration cycle and reduces the reductant over a lean interval between the rich intervals to reduce reductant consumption and hydrocarbon slip. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
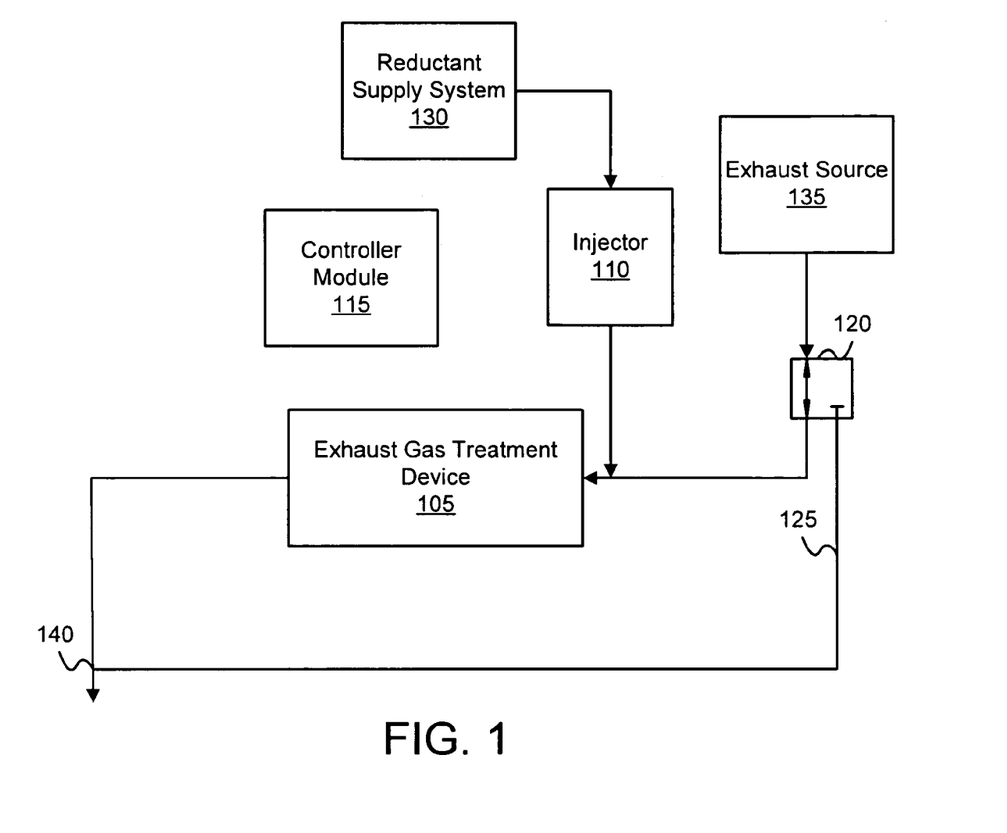
FIG. 1 is a schematic block diagram illustrating one embodiment of an exhaust system in accordance with the present invention.

FIG. 1 is a schematic block diagram illustrating one embodiment of an exhaust system 100 in accordance with the present invention. The system 100 includes an exhaust gas treatment device 105, an injector 110, a controller module 115, a bypass valve 120, a bypass line 125, a reductant supply system 130, an exhaust source 135, and an exhaust drain 140.

The exhaust source 135 may be an internal combustion engine such as a diesel engine or the like. The exhaust source 135 generates exhaust gas that includes emissions of one or more chemical compositions. The emissions may include NOX.

The exhaust gas treatment device 105 receives the exhaust gas from the exhaust source 135. In addition, the exhaust gas treatment device 105 reduces the emissions from the exhaust gas and discharges the exhaust gas through the exhaust gas drain 140. In one embodiment, the exhaust gas treatment device 105 is a catalytic converter. The catalytic converter may comprise a ceramic substrate wash coated with a sorbate carrier such as alumina, titania, zirconia, or the like. The catalytic converter may adsorb NOX as nitrates on the ceramic substrate to reduce NOX emissions.

The exhaust gas treatment device 105 may remove emissions such as NOX from the exhaust gas more efficiently when the exhaust gas treatment device 105 is regenerated. In one embodiment, the injector 110 provides a reductant from the reductant supply system 130 to the exhaust gas treatment device 105. The reductant may be an aqueous urea, also referred to as carbamide, a hydrocarbon such as diesel fuel and gasoline, or the like. The injector 105 may provide the reductant to the exhaust gas treatment device 105 by dispersing the reductant in the exhaust gas prior to the exhaust gas entering the exhaust gas treatment device 105.

The reductant creates a rich environment within the exhaust gas treatment device 105, wherein the reductant to oxygen ratio of the environment has an excess of reductant. In the rich environment, the excess of reductant regenerates the exhaust gas treatment device 105. In one embodiment, the excess of reductant drives adsorbed nitrates from the substrate surface or site of the catalytic converter and converts the nitrates to nitrogen.

In one embodiment, the bypass valve 120 diverts the exhaust gas from the exhaust gas treatment device 105 through the bypass line 125 to reduce the oxygen in the exhaust gas treatment device 105. The bypass valve 120 may divert the exhaust gas for exhaust sources 135 such as diesel engines that do not consume all oxygen during combustion. In one embodiment, the controller module 115 directs the bypass valve 120 to divert the exhaust gas during a regeneration cycle. The controller module 115 further directs the injector 110 to provide reductant to regenerate the exhaust gas treatment device 105 during the regeneration cycle.

Unfortunately, providing reductant to regenerate the exhaust gas treatment device 105 increases the cost of operating the system 100 as the reductant is consumed by the regeneration process. In addition, excess reductant may escape from the exhaust gas treatment device 105 through the exhaust gas drain 140, adding to emissions from the system 100.

The system 100 provides the reductant over a plurality of rich intervals during the regeneration cycle and reduces the reductant during a lean interval between the rich intervals to reduce the consumption of reductant and the cost of operating the system 100. In addition, the system 100 may reduce hydrocarbon slip be consuming excess reductant during the lean interval.

Figure 2:
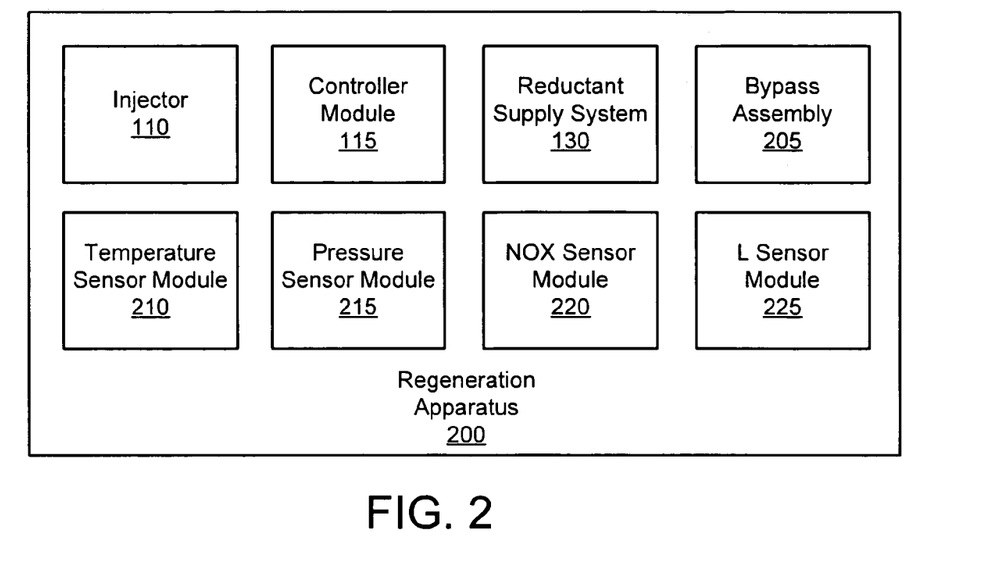
FIG. 2 is a schematic block diagram illustrating one embodiment of a regeneration apparatus of the present invention.

FIG. 2 is a schematic block diagram illustrating one embodiment of a regeneration apparatus 200 of the present invention. The apparatus 200 includes an injector 110, a controller module 115, a reductant supply system 130, a bypass assembly 205, a temperature sensor module 210, a pressure sensor module 215, a NOX sensor module 220, and an L sensor module 225. The system 100 of FIG. 1 may comprise the apparatus 200. In particularly, the injector 110, the controller module 115, and the reductant supply system 130 may be the injector 110, the controller module 115, and the reductant supply system 130 of FIG. 1. In one embodiment, the bypass assembly 205 comprises the bypass valve 120 and bypass line 125 of FIG. 1.

The injector 110 provides a reductant to an exhaust gas treatment device 105 such as the exhaust gas treatment device 105 of FIG. 1 during a regeneration cycle. In one embodiment, the injector 110 disperses measured quantities of reductant into the exhaust gas prior to the exhaust gas entering the exhaust gas treatment device 105. The injector 110 may atomize and disperse the reductant in the exhaust gas. In addition, the injector 110 may provide the reductant to the exhaust gas treatment device 105 when the bypass assembly 205 diverts the exhaust gas from the exhaust gas treatment device 105.

The reductant creates a rich environment within the exhaust gas treatment device 105 wherein the reductant to oxygen ratio of the exhaust gas has an excess of reductant. In the rich environment, the reductant regenerates the exhaust gas treatment device 105 and may improve the efficiency of the exhaust gas treatment device 105 in removing emissions.

The injector 110 provides reductant to the exhaust gas treatment device 105 in response to a command from the controller module 115. The controller module 115 directs the injector 110 to provide reductant during the regeneration cycle. The controller 115 may not direct the injector 110 to provide reductant to the exhaust gas treatment device 105 during an operational cycle. In one embodiment, the operational cycle is an adsorption cycle during which the exhaust gas treatment device 105 adsorbes emissions such as NOX. The adsorption cycle may be significantly longer than the regeneration cycle. In one embodiment, the absorption cycle is in the range of ten to one hundred (10-100) times longer than the regeneration cycle.

The controller module 115 directs the injector 110 to provide reductant over a plurality of rich intervals during the regeneration cycle. The controller module 115 further directs the injector 110 to reduce the reductant provided to the exhaust gas treatment device 105 over a lean interval between each rich interval. During the lean interval, the reductant to oxygen ratio of the exhaust gas has an excess of oxygen. In one embodiment, the injector 110 provides no reductant to the exhaust gas treatment device 105 over the lean interval.

The excess oxygen of the lean interval may consume excess reductant in the exhaust gas treatment device 105. For example, the controller module 115 may direct the injector 110 to provide reductant over a first rich interval. The controller module 115 may subsequently direct the injector 110 to provide no reductant over a lean interval. During the lean interval, the reductant to oxygen ratio decreases in exhaust gas treatment device 105 as oxygen increases. The increased oxygen oxidizes reductant including excess reductant.

Thus the lean interval reduces the reductant that exits the exhaust gas treatment device as hydrocarbon slip. In addition, the injector 110 provides less or no reductant over the lean interval, reducing the quantity of reductant required to regenerate the exhaust gas treatment device and the cost of regeneration.

In one embodiment, the temperature sensor module 210 measures the temperature of the exhaust gas. The temperature sensor module 210 may communicate the temperature measurement to the controller module 115. In a certain embodiment, the temperature sensor module 210 comprises a thermocouple as is well known to those skilled in the art.

The pressure sensor module 215 may measure the pressure of the exhaust gas and communicate the pressure measurement to the controller module 115. In a certain embodiment, the pressure sensor module 215 comprises a piezoelectric strain gauge coupled to a diaphragm as is well known to those skilled in the art. In one embodiment, the NOX sensor module 220 measures the NOX in the exhaust gas. The NOX sensor module 220 may further communicate the NOX measurement to the controller module 115.

In one embodiment, the L sensor module 225 measures the reductant to oxygen ratio or λ of the exhaust gas. In a certain embodiment, the L sensor module 225 estimates λ by measuring the oxygen in the exhaust gas. The L sensor module 225 may measure λ in two or more locations. In addition, the L sensor module 225 may determine the hydrocarbon slip of the exhaust gas by integrating the difference of measured λs. Equation 1 shows one embodiment of the calculation for hydrocarbon slip h where $\lambda_1$ is the λ measurement at a first L sensor module 225 and $\lambda_2$ is the λ measurement at a second L sensor module 225.

$$h = f(\lambda_1 - \lambda_2)$$ Equation 1

An exhaust state may comprise the temperature measurement, pressure measurement, NOX measurement, and hydrocarbon slip determination. In one embodiment, the controller module 115 modifies the reductant provided during each rich interval, the number of rich intervals, the length of rich intervals, and the length of lean intervals responsive to the exhaust gas state. The apparatus 200 increases the efficiency of reductant consumption during regeneration and reduces regeneration related emissions such as hydrocarbon slip.

Figure 3:
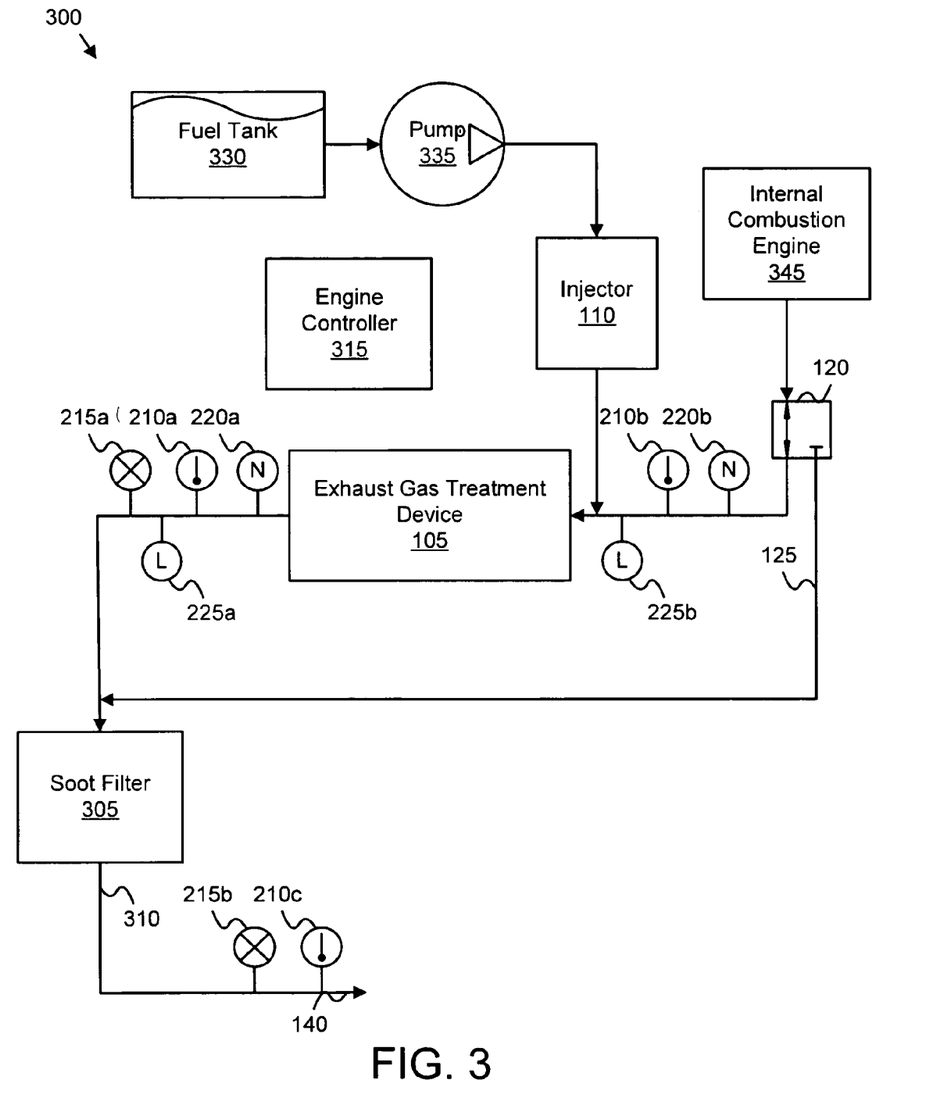
FIG. 3 is a schematic block diagram illustrating one embodiment of a closed loop exhaust system of the present invention.

FIG. 3 is a schematic block diagram illustrating one embodiment of a closed loop exhaust system 300 of the present invention. The system 300 includes a fuel tank 330 and a pump 335. The fuel tank 330 and pump 335 may comprise the reductant supply system 130 of FIGS. 1 and 2. In one embodiment, the fuel tank 330 stores a reductant such as diesel fuel. The pump 335 may deliver the diesel fuel to an injector 110 such as the injector of FIGS. 1 and 2.

The system 300 includes an internal combustion engine 345. The internal combustion engine 345 may be the exhaust source 135 of FIG. 1. In one embodiment, the internal combustion engine 345 is a diesel engine. The system 300 further includes an bypass valve 120, bypass line 125, exhaust gas treatment system 105, and exhaust gas drain 140 that may be the bypass valve 120, bypass line 125, exhaust gas treatment system 105, and exhaust gas drain 140 of the FIG. 1.

In the depicted embodiment, the system 100 includes an engine controller 315, a soot filter 305, one or more temperature sensor module 210, one or more pressure sensor modules 215, one or more NOX sensor modules 220, and one or more L sensor modules 225. The engine controller 315 may comprise the controller module 115 of FIGS. 1 and 2. In one embodiment, the controller module 115 comprises one or more software processes executing on the engine controller 315. The engine controller 315 may further execute a plurality of software processes to manage and control the engine 345.

The temperature sensor module 210, pressure sensor module 215, NOX sensor module 220, and L Sensor module 225 may be the temperature sensor module 210, pressure sensor module 215, NOX sensor module 220, and L Sensor module 225 of FIG. 2. In one embodiment, the temperature sensor module 210, pressure sensor module 215, NOX sensor module 220, and L Sensor module 225 communicate a temperature measurement, pressure measurement, NOX measurement, and hydrocarbon slip determination respectively to the engine controller 345. The engine controller 345 may modify the reductant provided during each rich interval, the number of rich intervals, the length of rich intervals, and the length of lean intervals responsive to the temperature measurement, pressure measurement, NOX measurement, and hydrocarbon slip determination.

Figure 4:
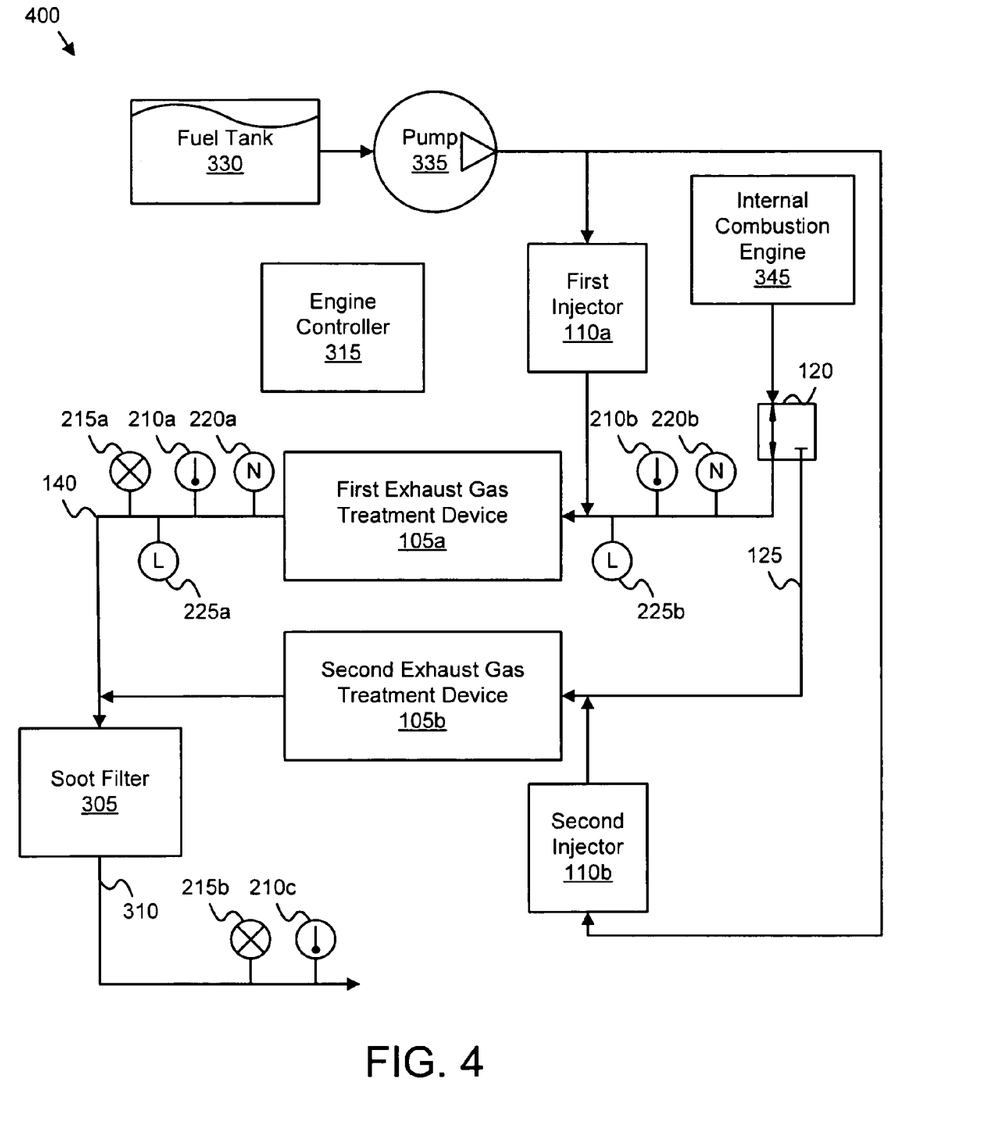
FIG. 4 is a schematic block diagram illustrating one embodiment of a treated bypass exhaust system of the present invention.

FIG. 4 is a schematic block diagram illustrating one embodiment of a treated bypass exhaust system 400 of the present invention. The system 400 includes the elements of the closed loop exhaust system 300 of FIG. 3. In addition, a second exhaust gas treatment device 105b removes emissions from exhaust gas in the bypass line 125. The bypass valve 120 may divert the exhaust gas from the first exhaust gas treatment device 105a to the second exhaust gas treatment device 105b while the system 400 regenerates the first exhaust gas treatment device 105a. The second exhaust gas treatment device 105b may remove emissions from the diverted exhaust gas, preventing the discharge of untreated exhaust gas.

In one embodiment, a second injector 110b provides reductant to the second exhaust gas treatment device 105b. The engine controller 345 may direct the second injector 110b to provide reductant over a plurality of rich intervals during a second exhaust gas treatment device 105b regeneration cycle. The engine controller 345 may further direct the second injector 110b to reduce the reductant provided to the second exhaust gas treatment device 105b over a lean interval between the rich intervals.

Figure 5:
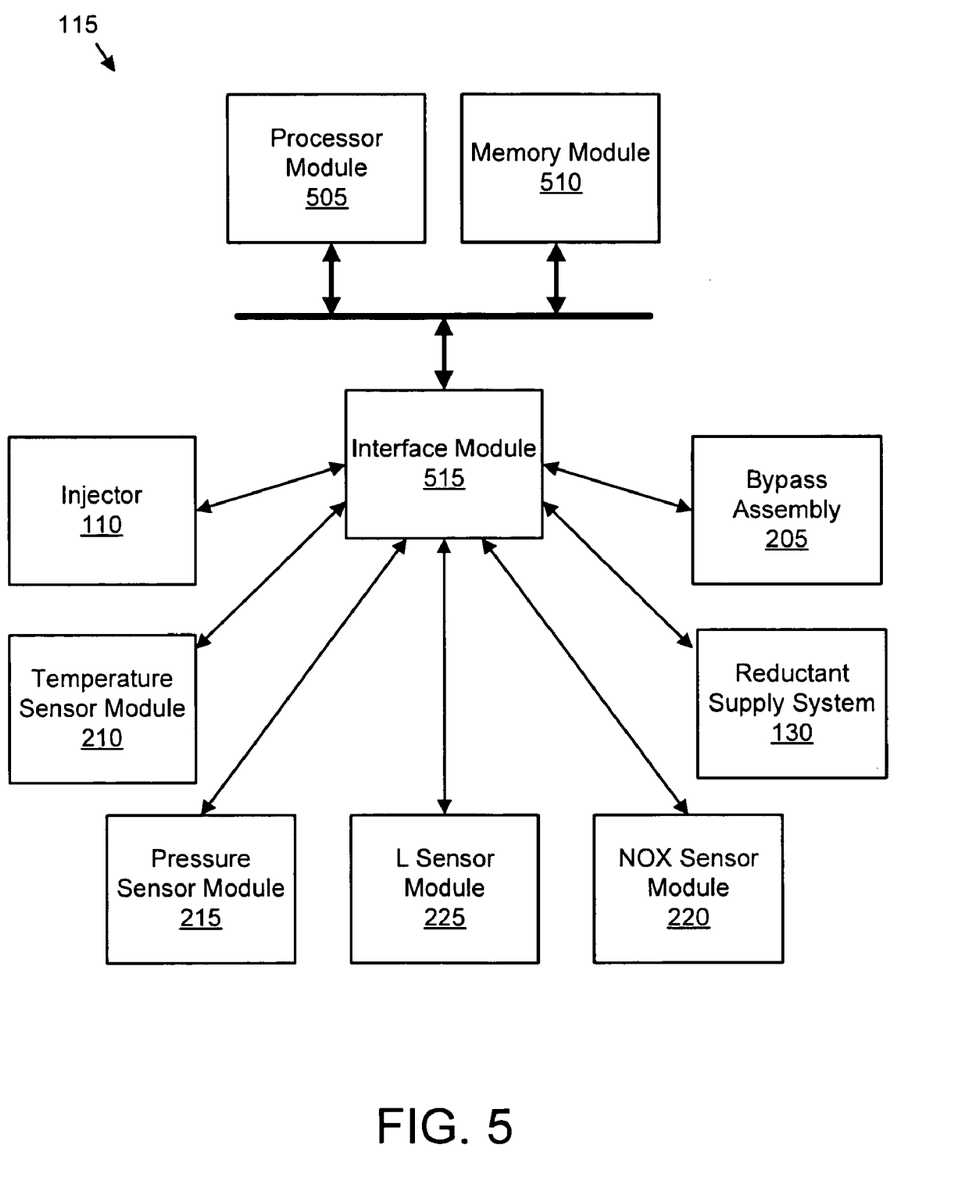
FIG. 5 is a schematic block diagram illustrating one embodiment of a controller module of the present invention.

FIG. 5 is a schematic block diagram illustrating one embodiment of a controller module 115 of the present invention. The controller module 115 may be the controller module 115 of FIGS. 1 and 2. In addition, the controller module 115 may comprise the engine controller 345 of FIGS. 3 and 4.

The controller module 115 includes a processor module 505, a memory module 510, and an interface module 515. The processor module 505, memory module 510, and interface module 515 may be fabricated of semiconductor gates on one or more semiconductor substrates. Each semiconductor substrate may be packaged in one or more semiconductor devices mounted on circuit cards. Connections between the processor module 505, the memory module 510, and the interface module 515, may be through semiconductor metal layers, substrate to substrate wiring, or circuit card traces or wires connecting the semiconductor devices.

The memory module 510 stores software instructions and data. The processor module 505 executes the software instructions and manipulates the data as is well know to those skilled in the art. The processor module 505 is depicted communicating through the interface module 515 with an injector 110, bypass assembly 205, temperature sensor module 210, pressure sensor module 215, NOX sensor module 220, L Sensor module 225, and reductant supply system 130 which may be the injector 110, bypass assembly 205, temperature sensor module 210, pressure sensor module 215, NOX sensor module 220, L Sensor module 225, and reductant supply system of FIG. 2. The interface module 515 may communicate with the injector 110, bypass assembly 205, temperature sensor module 210, pressure sensor module 215, NOX sensor module 220, L Sensor module 225, and reductant supply system 130 through dedicated electrical communication buses, an electrical communications loop, or the like.

In one embodiment, the processor module 505 executes one or more software processes that receive a temperature measurement, pressure measurement, NOX measurement, and hydrocarbon slip determination from the temperature sensor module 210, pressure sensor module 215, NOX sensor module 220, and L Sensor module 225 respectively. The software processes may further direct the injector 110 and reductant supply system 130 to provide reductant and the bypass assembly 205 to divert exhaust gas.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
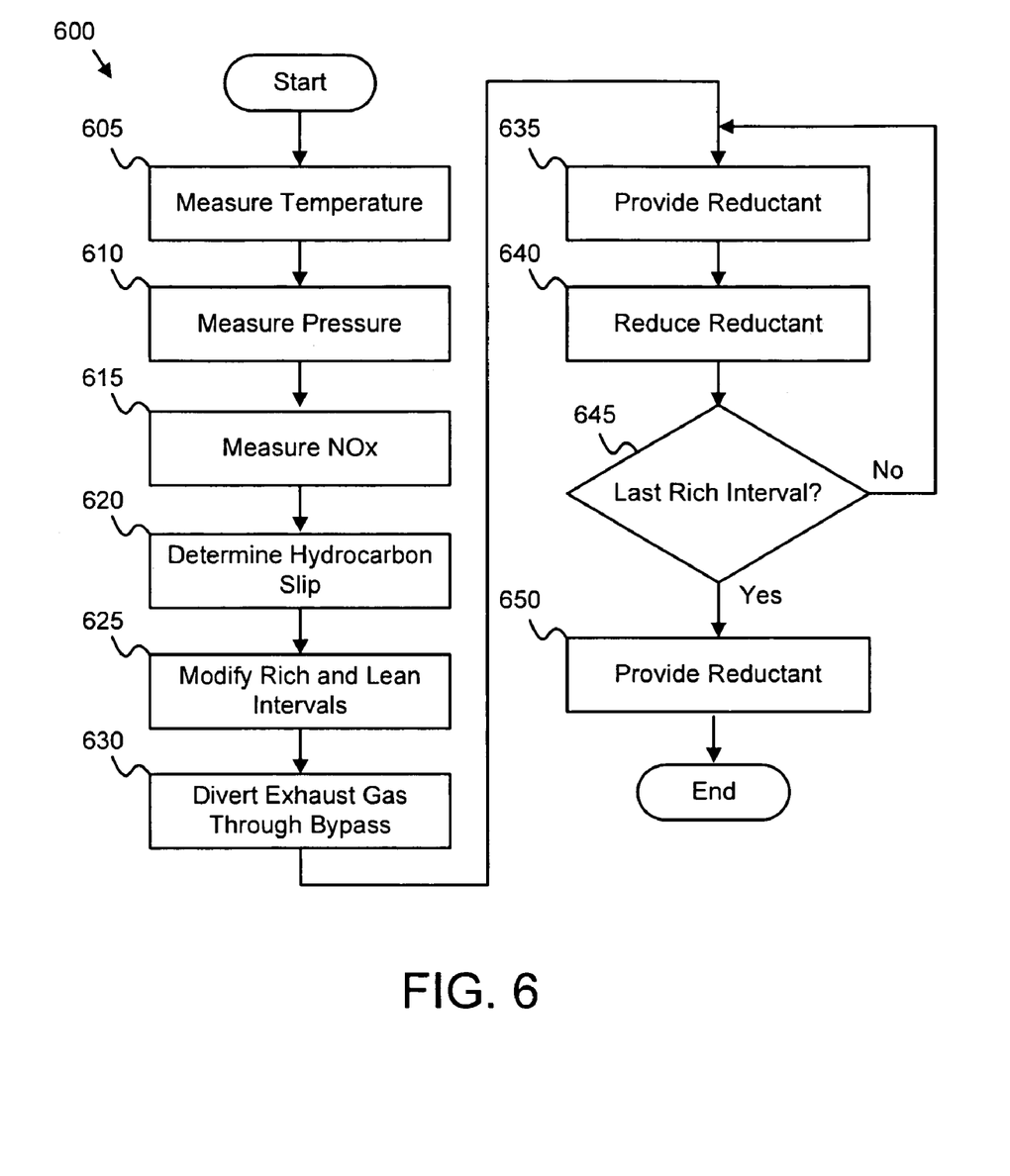
FIG. 6 is a schematic flow chart diagram illustrating one embodiment of a regeneration method of the present invention.

FIG. 6 is a schematic flow chart diagram illustrating one embodiment of a regeneration method 600 of the present invention. The method 600 substantially includes the steps necessary to carry out the functions presented above with respect to the operation of the described system 100 and apparatus 200 of FIGS. 1 and 2 respectively.

The method 600 begins and in one embodiment, a temperature sensor module 210 such as the temperature sensor module 210 of FIG. 2 measures 605 the temperature of exhaust gas and communicates the temperature measurement to a controller module 115 such as the controller module 115 of FIG. 2. The exhaust gas may be from an exhaust gas source 135 such as the exhaust gas source 135 of FIG. 1 or the internal combustion engine 345 of FIGS. 3 and 4.

In one embodiment, a pressure sensor module 215 such as the pressure sensor module 215 of FIG. 2 measures 610 the pressure of the exhaust gas. The pressure sensor module 215 may also communicate the pressure measurement to the controller module 115. A NOX sensor module 220 such as the NOX sensor module 220 of FIG. 2 may measure 615 the NOX in the exhaust gas and communicate the NOX measurement to the controller module 115. In a certain embodiment, an L sensor module 225 determines 620 the hydrocarbon slip of the exhaust gas and communicates the hydrocarbon slip to the controller module 115. An exhaust gas state may comprise the temperature measurement, the pressure measurement, the NOX measurement, and/or the hydrocarbon slip determination.

In one embodiment, the controller module 115 modifies 625 one or more parameters specifying the delivery of reductant to an exhaust gas treatment device 105 such as the exhaust gas treatment device 105 of FIG. 1 in response to the exhaust gas state. The parameters may specify the length of an adsorption cycle, the length of a regeneration cycle, the number of rich intervals during a regeneration cycle, quantity of reductant provided during each rich intervals, the length of the rich intervals, the length of a lean interval between the rich intervals, and the quantity of reductant provided during the lean interval. In one embodiment, the controller module 115 calculates a reductant flow rate for each rich interval.

For example, the controller module 115 may increase the number of rich intervals from two (2) to three (3) and reduce the length of each rich interval from one hundred fifty milliseconds (150 ms) to one hundred milliseconds (100 ms) if the temperature measurement is in the range two hundred degrees Celsius (200° C.) to four hundred degrees Celsius (400° C.). In an alternate example, the controller module 115 may decrease the number of rich intervals from three (3) to two (2) and increase the length of each rich interval from one hundred milliseconds (100 ms) to two hundred milliseconds (200 ms) if the temperature measurement is in the range four hundred degrees Celsius (400° C.) to seven hundred degrees Celsius (700° C.).

In one embodiment, the controller module 115 directs a bypass assembly 205 such as the bypass assembly 205 of FIG. 2 to divert 630 the exhaust gas from the exhaust gas treatment device 105. The controller module 115 may direct the bypass assembly 205 to divert the exhaust gas during the regeneration cycle.

The controller module 115 directs an injector 110 such as the injector 110 of FIG. 2 to provide 635 reductant to the exhaust gas treatment device 105 over a rich interval during a regeneration cycle. The length of the rich interval and the quantity of reductant provided may be specified by the parameters. In addition, the controller module 115 directs the injector 110 to reduce 640 the reductant provided to the exhaust gas treatment device 105 over a lean interval. In one embodiment, the injector 110 provides no reductant during the lean interval. The lean interval creates a lean environment within the exhaust gas treatment device 105 wherein excess reductant may be consumed. In one embodiment, the lean interval length is in the range of zero point two five seconds to ten seconds (0.25 s to 10 s). Reducing 640 the reductant during the lean interval reduces total reductant consumption.

The controller module 115 determines 645 if the injector 110 is to provide reductant for the last rich interval specified by the parameters. If the injector 110 is not to provide reductant for the last rich interval, the controller module 115 directs the injector 110 to provide 635 reductant to the exhaust gas treatment device 105 over a subsequent rich interval. The length of the rich interval and the quantity of reductant provided may differ from the prior rich interval. If the injector 110 is to provide reductant for the last rich interval, the controller module 115 directs the injector 110 to provide 645 the reductant to the exhaust gas treatment device 105 over a rich interval and the method 600 terminates. The method 600 efficiently regenerates the exhaust gas treatment device 105 while reducing hydrocarbon slip.

Figure 7:
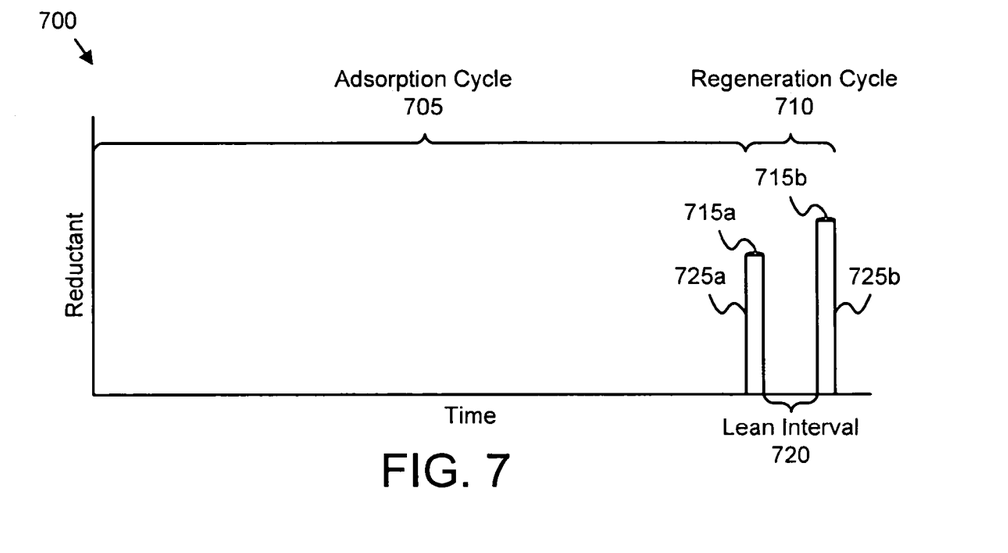
FIG. 7 is a plot illustrating one embodiment of an adsorption/regeneration cycle of the present invention.

FIG. 7 is a plot illustrating one embodiment of an adsorption/regeneration cycle 700 of the present invention. The cycle 700 depicts the provision 635 of a reductant to an exhaust gas treatment device 105 such as the exhaust gas treatment device 105 of FIGS. 1, 3, and 4. The provision 635 of reductant is plotted as reductant flow rate as a function of time. A controller module 115 such as the controller module 115 of FIG. 2 determines the length of an adsorption cycle 705 and a regeneration cycle 710. During the adsorption cycle 705, the exhaust gas treatment device 105 may remove emissions from exhaust gas. During the regeneration cycle, the controller module 115 directs an injector 110 such as the injector 110 of FIGS. 1-4 to provide 635 reductant to regenerate the exhaust gas treatment device 105. As depicted, the controller module 115 directs the injector 110 to provide 635 the reductant over a plurality of rich intervals 725 at one or more specified flow rates and rich interval lengths 715 with a lean interval 720 between each rich interval 725.

Figure 8:
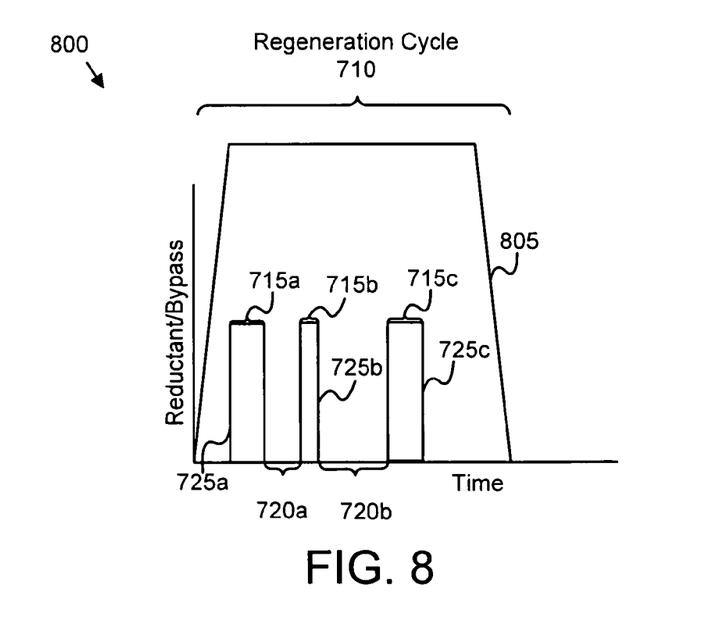
FIG. 8 is a plot illustrating one embodiment of reductant injection and exhaust gas bypass of the present invention.

FIG. 8 is a plot illustrating one embodiment of reductant injection and exhaust gas bypass 800 of the present invention. The provision 635 of reductant by an injector 110 during the regeneration cycle 710 of FIG. 7 is depicted. The provision 635 of reductant is plotted as reductant flow rate as a function of time. In addition, the flow rate 805 of exhaust gas through a bypass line 125 such as the bypass lines 125 of FIGS. 1, 3, and 4 is shown plotted as the exhaust gas flow rate 805 as a function of time. As depicted, a bypass valve 120 such as the bypass valves 120 of FIGS. 1, 3, and 4 may divert the exhaust gas at the beginning of the regeneration cycle 710, with the diverted exhaust gas flow rate increasing to a peak flow rate. The bypass valve 120 may begin to close prior to the end of the regeneration cycle 710, with diverted exhaust gas flow terminating at the end of the regeneration cycle 710. In addition, an injector 110 such as the injector 110 of FIG. 1-4 provides 635 reductant over a plurality of rich intervals 725, each rich interval 725 with a specified length 715.

Figure 9:
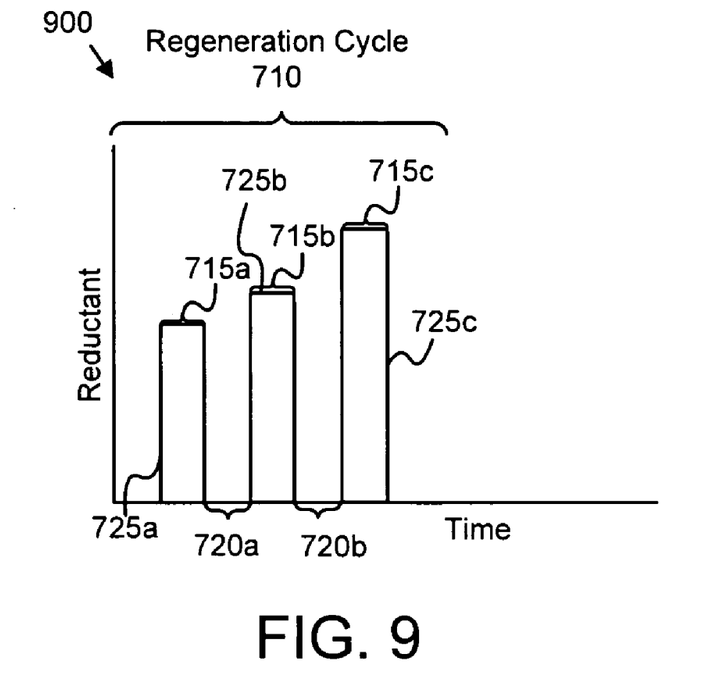
FIG. 9 is a plot illustrating one embodiment of reductant injection over a regeneration cycle of the present invention.

FIG. 9 is a plot illustrating one embodiment of reductant injection over a regeneration cycle 900 of the present invention. The cycle 900 depicts provision 635 of reductant to an exhaust gas treatment device 105 such as the exhaust gas treatment device 105 of FIGS. 1, 3, and 4 over a regeneration cycle 710 such as the regeneration cycle 710 of FIG. 7. The provision 635 of reductant is plotted as reductant flow rate as a function of time.

A controller module 115 such as the controller module 115 of FIG. 2 directs an injector 110 such as the injector 110 of FIG. 2 to provide 635 reductant to the exhaust gas treatment device 105 over a plurality of rich intervals 725. The injector 110 provides reductant at increasing flow rates for each subsequent rich interval 725. Increasing the flow rate for each subsequent rich interval 725 may improve the efficiency of reductant consumption during regeneration.

Figure 10:
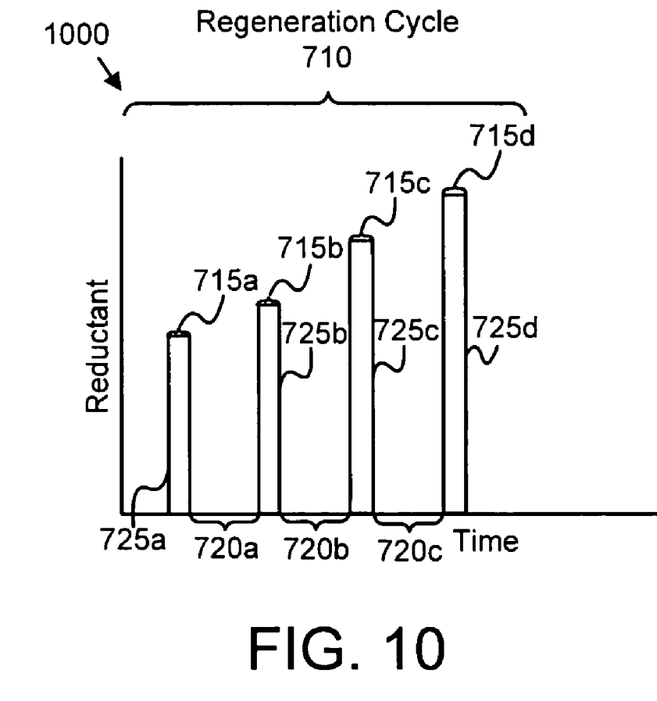
FIG. 10 is a plot illustrating one embodiment of reductant injection over a low-temperature regeneration cycle of the present invention.

FIG. 10 is a plot illustrating one embodiment of reductant injection over a low-temperature regeneration cycle 1000 of the present invention. The cycle 1000 depicts provision 635 of reductant to an exhaust gas treatment device 105 such as the exhaust gas treatment device 105 of FIGS. 1, 3, and 4 over a regeneration cycle 710 such as the regeneration cycle 710 of FIG. 7. The provision 635 of reductant is plotted as reductant flow rate as a function of time.

In the depicted embodiment, a controller module 115 such as the controller module 115 of FIG. 2 modifies 625 parameters including the number of rich intervals 725, the rich interval length 715, the quantity of reductant provided, and the length of the lean intervals 720 from FIG. 9. The controller module 115 may modify 625 the parameters in response to an exhaust gas state that includes a temperature measurement. As depicted, the controller module 115 directs an injector 110 such as the injector 110 of FIG. 2 to provide 635 reductant to the exhaust gas treatment device 105 over an increased number of rich intervals 725 with decreased rich interval length 715 in response to a low exhaust gas temperature such as a temperature in the range two hundred degrees Celsius (200° C.) to four hundred degrees Celsius (400° C.).

Figure 11:
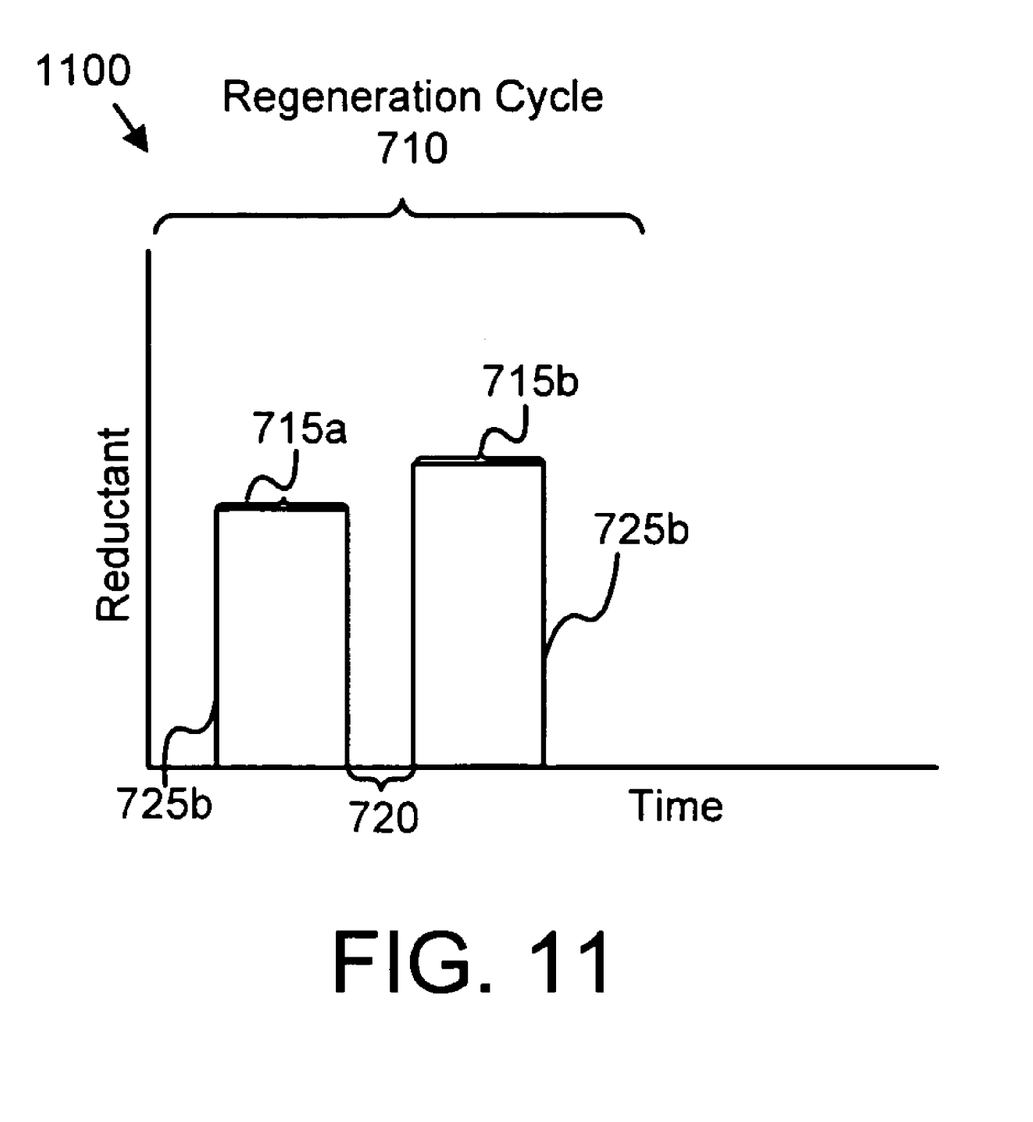
FIG. 11 is a plot illustrating one alternate embodiment of reductant injection over a high-temperature regeneration cycle of the present invention.

FIG. 11 is a plot illustrating one alternate embodiment of reductant injection over a high-temperature regeneration cycle 1100 of the present invention. The cycle 1100 depicts provision 635 of reductant to an exhaust gas treatment device 105 such as the exhaust gas treatment device 105 of FIGS. 1, 3, and 4 over a regeneration cycle 710 such as the regeneration cycle 710 of FIG. 7. The provision 635 of reductant is plotted as reductant flow rate as a function of time.

In the depicted embodiment, a controller module 115 such as the controller module 115 of FIG. 2 modifies 625 parameters including the number of rich intervals 725, the rich interval length 715, the quantity of reductant provided, and the length of the lean intervals 720 from FIG. 9. The controller module 115 may modify 625 the parameters in response to an exhaust gas state. For example, the controller module 115 may direct an injector 110 such as the injector 110 of FIG. 2 to provide 635 reductant to the exhaust gas treatment device 105 over a decreased number of rich intervals 725 with increased rich interval length 715 in response to a high exhaust gas temperature such as a temperature in the range of four hundred degrees Celsius (400° C.) to seven hundred degrees Celsius (700° C.).

The present invention is the first to provide reductant to an exhaust gas treatment device 105 over a plurality of rich intervals 725 during a regeneration cycle and reduce the reductant over a lean interval 720 between the rich intervals to reduce reductant consumption and hydrocarbon slip. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to regenerate an exhaust gas treatment device in exhaust gas stream receiving communication with an internal combustion engine, the apparatus comprising:
    an injector configured to inject reductant into the exhaust gas stream at a location between the internal combustion engine and the exhaust gas treatment device; and
    a controller module configured to direct the injector to inject the reductant into the exhaust gas stream over a plurality of rich intervals during a regeneration event on the exhaust gas treatment device to create a rich environment within the exhaust gas treatment device and to reduce the reductant injected into the exhaust gas stream over at least one lean interval between two of the plurality of rich intervals during the regeneration event on the exhaust gas treatment device to create a lean environment within the exhaust gas treatment device;
    wherein the controller module is configured to control the injection of reductant into the exhaust gas stream during the regeneration event according to at least one of first and second modes, the first mode comprising injecting a constant amount of reductant over each of the plurality of rich intervals with the length of at least two of the plurality of rich intervals being different, and the second mode comprising injecting an increased amount of reductant over each subsequent rich interval of the plurality of rich intervals with the length of each of the plurality of rich intervals being the same.

2. The apparatus of claim 1, further comprising a bypass assembly configured to divert exhaust gas to bypass the exhaust gas treatment device during the regeneration cycle.

3. The apparatus of claim 1, wherein the controller module is further configured to modify the amount of reductant injected during each rich interval, the number of rich intervals, the length of the rich intervals, and the length of the lean intervals responsive to an exhaust gas state.

4. The apparatus of claim 3, further comprising a nitrogen oxide sensor module configured to measure the nitrogen oxide in exhaust gas, the exhaust gas state comprising the nitrogen oxide measurement.

5. The apparatus of claim 3, further comprising a temperature sensor module configured to measure the temperature of exhaust gas, the exhaust gas state comprising the temperature measurement.

6. The apparatus of claim 3, further comprising a pressure sensor module configured to measure the pressure of exhaust gas, the exhaust gas state comprising the pressure measurement.

7. The apparatus of claim 3, further comprising a sensor module configured to determine the hydrocarbon slip of exhaust gas, the exhaust gas state comprising the hydrocarbon slip determination.

8. A method for regenerating a exhaust gas treatment device, the method comprising:
    injecting reductant into an exhaust gas stream between an internal combustion engine and an exhaust gas treatment device during a plurality of rich intervals of a regeneration cycle on the exhaust gas treatment device to create a rich environment within the exhaust gas treatment device; and
    reducing the amount of reductant injected into the exhaust gas stream between the internal combustion engine and the exhaust gas treatment device during a lean interval of the regeneration cycle, the lean interval occurring between the plurality of rich intervals to create a lean environment within the exhaust gas treatment device;
    wherein the amount of reductant injected is increased for each subsequent rich interval of the plurality of rich intervals of the regeneration cycle.

9. The method of claim 8, further comprising diverting exhaust gas to bypass the exhaust gas treatment device during the regeneration event on the exhaust gas treatment device.

10. The method of claim 8, further comprising modifying the amount of reductant injected during each rich interval, the number of rich intervals, the length of the rich intervals, and the length of the lean intervals responsive to an exhaust gas state.

11. The method of claim 10, further comprising determining the hydrocarbon slip in exhaust gas, the exhaust gas state comprising the hydrocarbon slip determination.

12. The method of claim 10, further comprising measuring the nitrogen oxide in exhaust gas, the exhaust gas state comprising the nitrogen oxide measurement.

13. The method of claim 10, further comprising measuring the temperature of exhaust gas, the exhaust gas state comprising the temperature measurement.

14. The method of claim 13, further comprising shortening each rich interval and increasing the number of rich intervals responsive to a low exhaust gas temperature.

15. The method of claim 13, further comprising lengthening each rich interval and decreasing the number of rich intervals responsive to a high exhaust gas temperature.

16. The method of claim 8, wherein each lean interval is in the range of 0.25 to 10 seconds.

17. The method of claim 8, wherein the exhaust gas treatment device comprises a nitrogen oxide absorber.

18. A signal bearing medium tangibly embodying a program of machine-readable instructions executable by a digital processing apparatus to perform operations to regenerate an exhaust gas treatment device in exhaust gas stream receiving communication with an internal combustion engine, the operations comprising:
    conducting a regeneration event on the exhaust gas treatment device, the regeneration event comprising a plurality of rich time intervals and at least one lean time interval occurring between two of the plurality of rich time intervals;
    injecting reductant into the exhaust gas stream at a location between the internal combustion engine and the exhaust treatment device during the plurality of rich time intervals to create a rich environment within the exhaust gas treatment device; and
    reducing the reductant injected into the exhaust gas stream during the at least one lean interval to create a lean environment within the exhaust gas treatment device;
    wherein injecting reductant into the exhaust gas stream during the plurality of rich intervals comprises at least one of injecting a constant amount of reductant over each of the plurality of rich intervals with the length of at least two of the plurality of rich intervals being different, and injecting an increased amount of reductant over each subsequent rich interval of the plurality of rich intervals with the length of each of the plurality of rich intervals being the same.

19. The signal bearing medium of claim 18, wherein the instructions further comprise an operation to modify the amount of reductant injected during each rich interval, the number of rich intervals, the length of the rich intervals, and the length of the lean intervals responsive to an exhaust gas state.

20. The signal bearing medium of claim 19, wherein the instructions further comprise operations to:
    measure the temperature of exhaust gas;
    measure the pressure of the exhaust gas;
    measure the nitrogen oxide of the exhaust gas; and
    measure the hydrocarbon slip of the exhaust gas.

* * * * *